(12) United States Patent
Kuo (10) Patent No.: US 8,139,178 B2
(45) Date of Patent: Mar. 20, 2012

(54) ANTI-STATIC HOUSING AND RELATED DISPLAY DEVICE ASSEMBLY

(75) Inventor: Yu-Ling Kuo, Taipei Hsien (TW)

(73) Assignee: Wistron Corporation, New Taipei (TW)

(*) Notice: Subject to any disclaimer, the term of this patent is extended or adjusted under 35 U.S.C. 154(b) by 176 days.

(21) Appl. No.: 12/754,158

(22) Filed: Apr. 5, 2010

(65) Prior Publication Data

US 2011/0075330 A1   Mar. 31, 2011

(30) Foreign Application Priority Data

Sep. 25, 2009   (TW) .................................. 98217759 U (51) Int. Cl.
*G02F 1/1333* (2006.01)
(52) U.S. Cl. ......................................................... 349/58
(58) Field of Classification Search ...................... 349/58
See application file for complete search history.

(56) References Cited

U.S. PATENT DOCUMENTS

| 2004/0224544 A1* | 11/2004 | Suwa et al. | 439/142 |
| 2005/0094053 A1* | 5/2005 | Byun | 349/58 |
| 2010/0265430 A1* | 10/2010 | Xu | 349/58 |

* cited by examiner

*Primary Examiner* — Uyen Chau N Le
*Assistant Examiner* — Chris Chu
(74) *Attorney, Agent, or Firm* — Osha • Liang LLP (57) ABSTRACT

A display device assembly includes an anti-static housing and a displaying module contained therein. The anti-static housing has a first housing body, a second housing body and a plurality of anti-static dielectric layers. The first housing body and the second housing body respectively have a first rail-and-groove engaging structure and a second rail-and-groove engaging structure, and can be moved relative to each other such that the first rail-and-groove engaging structure engages the second rail-and-groove engaging structure. Due to dispositions of the first and second rail-and-groove engaging structures and the anti-static dielectric layers when the first and second housing bodies are coupled together, the anti-static housing has comparatively superior anti-static characteristics, and a manner of engagement between the first and second rail-and-groove engaging structures facilitates assembly of the anti-static housing and thus reduces assembly costs.

30 Claims, 5 Drawing Sheets

ANTI-STATIC HOUSING AND RELATED DISPLAY DEVICE ASSEMBLY

CROSS-REFERENCE TO RELATED APPLICATION

This application claims priority of Taiwanese application no. 098217759, filed on Sep. 25, 2009.

BACKGROUND OF THE INVENTION

1. Field of the Invention

The invention relates to a display device assembly, more particularly to an anti-static housing and a displaying module assembled in a display device.

2. Description of the Related Art

Prior to delivery, common electronic devices such as mobile phones, display devices, and computers are typically tested to determine their degree of susceptibility to electrostatic discharge (ESD). The ESD test is conducted in order to ensure that internal electronic components of the electronic devices are not susceptible to damage or signal interference from electrostatic discharge generated by use of the electronic devices in a dry environment or in an environment otherwise prone to generating electrostatic discharge.

Figure 1:
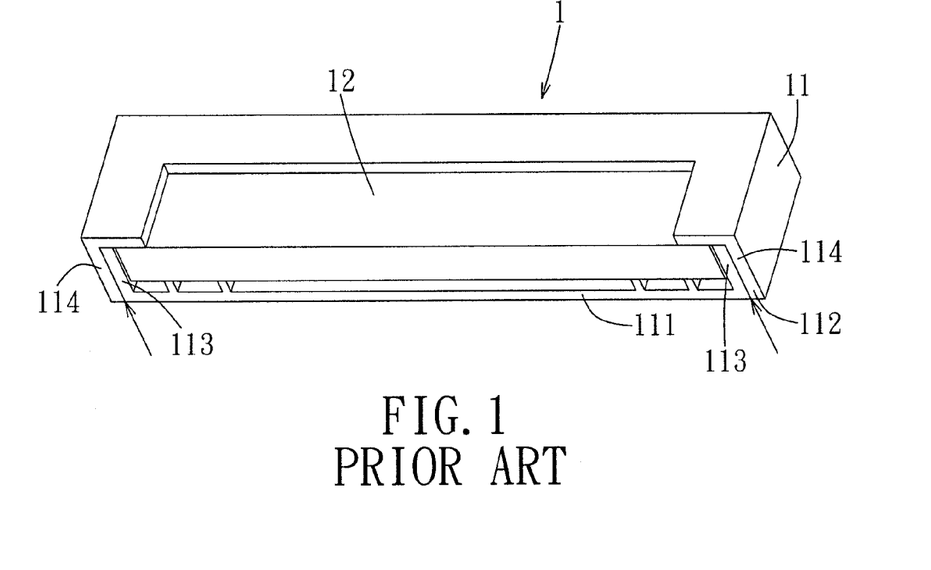
FIG. 1 is a perspective view of a conventional displaying module.

Referring to FIG. 1, a conventional display device module 1 used in a video telephone is shown to include a display device housing 11 and a display device 12 contained in the display device housing 11. The display device housing 11 includes a first housing body 111 and a second housing body 112. The first housing body 111 includes a pair of first lateral walls 113 spaced apart from each other, and the second housing body 112 includes a pair of second lateral walls 114 spaced apart from each other. To assemble the display device housing 11, the first and second housing bodies 111, 112 are moved relative to each other in vertical directions and are fastened together with the use of screws.

After assembly, the ESD test is performed using an ESD gun to generate static electricity along seam locations (indicated by arrows in FIG. 1) between the first and second housing bodies 111,112 and toward an interior of the display device housing 11 in order to measure an extent to which the display device 12 is affected by static electricity.

The ESD test often reveals that the display device 12 of the conventional display device module 1 is prone to adverse effects from static electricity. Such susceptibility is attributable to formation of a gap between adjacent pairs of the first and second lateral walls 113,114 of the display device housing 11 when the first and second housing bodies 111,112 are fastened together, and to substantially planar surfaces of the first and second lateral walls 113,114, which permit passage of electrostatic discharge emitted by the ESD gun into the display device housing 11. The conventional display device module 1 is thus prone to fail strict ESD tests required in some countries.

Moreover, since the first and second housing bodies 111, 112 are fastened together with the use of screws, assembly is inefficient and results in higher assembly costs.

SUMMARY OF THE INVENTION

Therefore, one object of the present invention is to provide an anti-static housing that is easy to assemble on a display device so as to reduce assembly costs.

Another object of the present invention is to provide a display device having the anti-static housing.

According to the present invention, there is provided an anti-static housing adapted for covering a displaying module having a displaying screen therein. The anti-static housing comprises a first housing body, a second housing body, and a plurality of anti-static dielectric layers.

The first housing body includes a bottom wall, a pair of first lateral walls spaced apart from each other and extending upward from the bottom wall, and a first connecting wall extending upward from the bottom wall and interconnecting the first lateral walls. Each of the first lateral walls has a horizontally extending first rail-and-groove engaging structure formed thereon.

The second housing body includes a top wall having a window region, a pair of second lateral walls spaced apart from each other and extending downward from the top wall, and a second connecting wall extending downward from the top wall and interconnecting the second lateral walls. Each of the second lateral walls has a horizontally extending second rail-and-groove engaging structure formed thereon.

The anti-static dielectric layers are disposed on one of the first lateral walls and the second lateral walls.

The first and second housing bodies are movable relative to each other in horizontal directions such that one of the first lateral walls and the second lateral walls are disposed on inner sides of the other of the first lateral walls and the second lateral walls, such that the first rail-and-groove engaging structures of the first lateral walls engage the second rail-and-groove engaging structures of the second lateral walls, such that the first and second housing bodies cooperate to define a containing space that is adapted to cover the displaying module with the displaying screen visible through the window region, and such that the anti-static dielectric layers are disposed between adjacent pairs of the first and second lateral walls so as to impede passage of static electricity between the adjacent pairs of the first and second lateral walls.

According to another aspect of the present invention, there is provided a display device assembly including the above-described anti-static housing and a displaying module having a displaying screen. When the first and second housing bodies of the anti-static housing are coupled together, the displaying module is contained in the containing space between the first and second housing bodies such that the displaying screen is visible through the window region.

The merit of the present invention resides in that when the first and second housing bodies of the anti-static housing are coupled together, the first and second rail-and-groove engaging structures are disposed so as to impede passage of static electricity through gaps between the first and second housing bodies, and the anti-static dielectric layers disposed between adjacent pairs of the first and second lateral walls further impede such passage of static electricity. The anti-static housing of the present invention thus has enhanced anti-static characteristics. In addition, use of the first and second rail-and-groove engaging structures facilitates assembly of the anti-static housing and reduces assembly cost.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
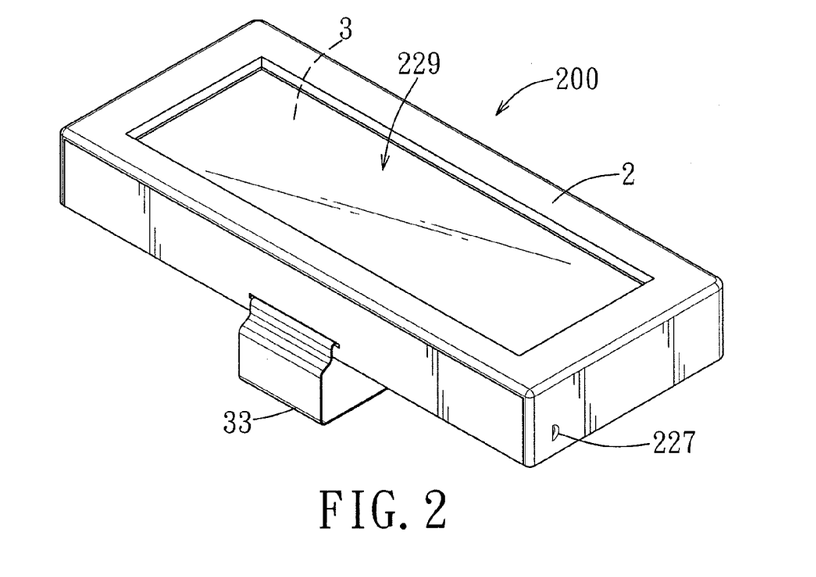
FIG. 2 is a perspective view of a preferred embodiment of a display device assembly according to the present invention.

FIG. 2 illustrates the preferred embodiment of a display device assembly 200 according to the present invention. The display device assembly 200 comprises a anti-static housing 2 and a displaying module 3. In this embodiment, the display device assembly 200 is adapted to be coupled to a telephone so as to provide the telephone with video display functionality. However, application of the display device assembly 200 is not limited to what is disclosed herein. The display device assembly 200 can be adapted to provide display functionality to another type of electronic device.

Figure 3:
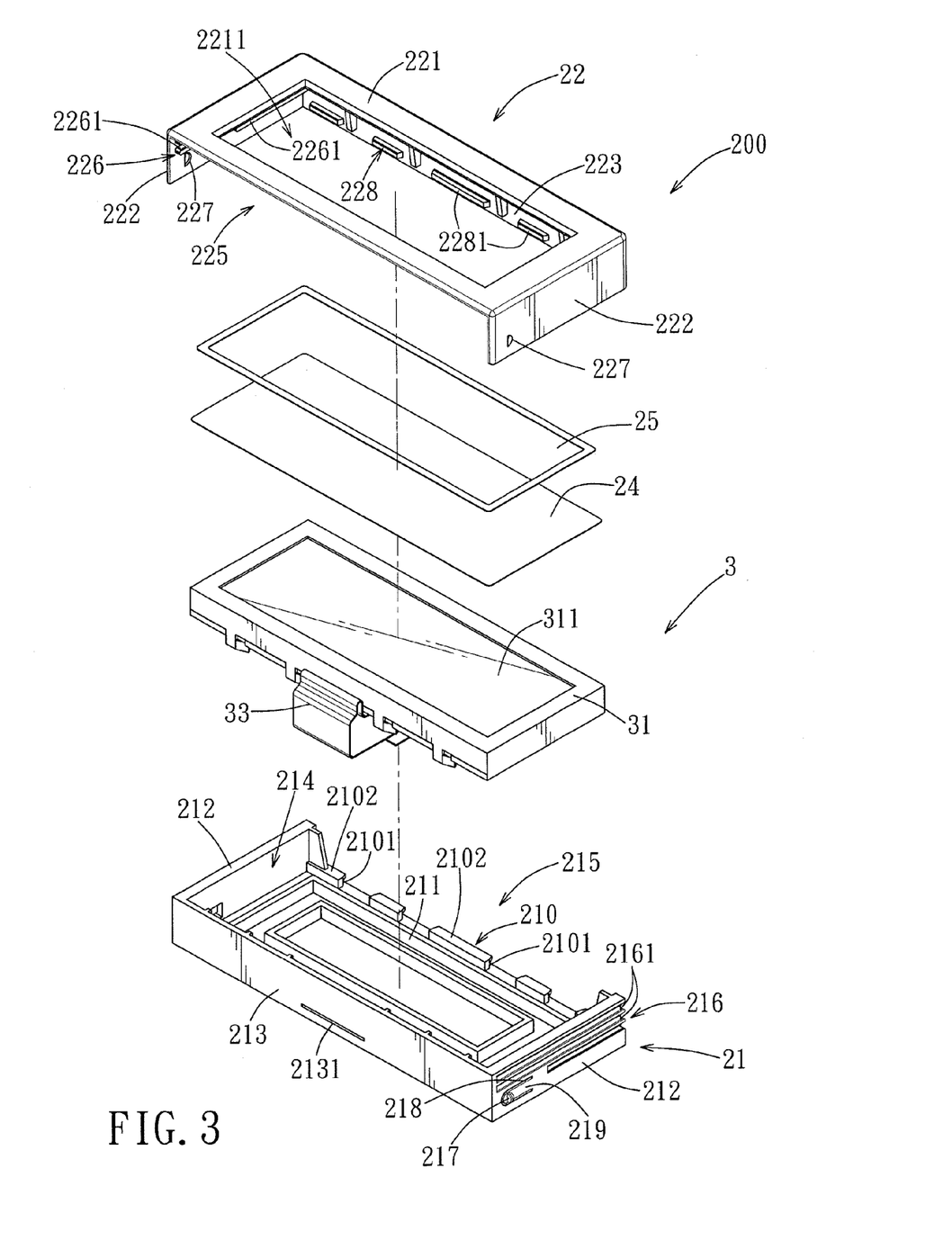
FIG. 3 is an exploded perspective view of the preferred embodiment of a display device assembly.
Figure 7:
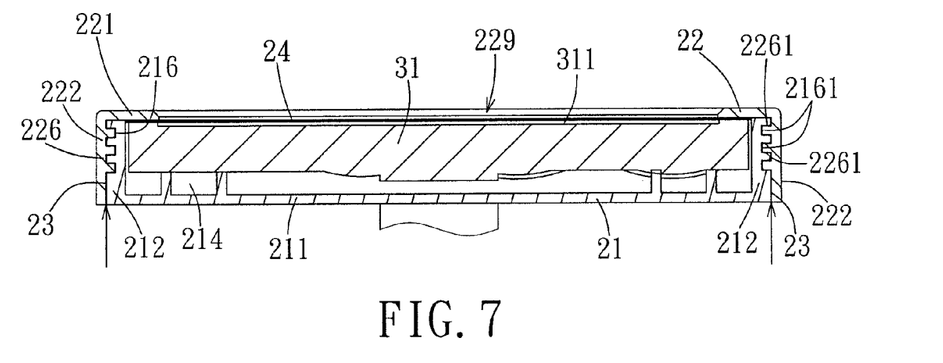
FIG. 7 is a sectional view of the preferred embodiment cut from the left side to the right side.

Referring to FIGS. 2, 3 and 7, the anti-static housing 2 has a first housing body 21, a second housing body 22 and a plurality of anti-static dielectric layers 23.

The first housing body 21 includes a bottom wall 211, a pair of first lateral walls 212 spaced apart from each other and extending upward from left and right edges of the bottom wall 211, and a first connecting wall 213 extending upward from a front edge of the bottom wall 211 and interconnecting the first lateral walls 212. Each of the first lateral walls 212 has a horizontally extending first rail-and-groove engaging structure 216 formed thereon, as best shown in FIG. 3 (only one is shown due to the viewing angle). In this embodiment, each of the first lateral walls 212 has an outer face formed with the first rail-and-groove structure 216, and each of the first rail-and-groove structures 216 is defined by a plurality of horizontally extending grooves 2161 vertically spaced apart from each other. Preferably, the grooves 2161 of each of the first lateral walls 212 have terminal ends spaced apart from a junction of the first lateral wall 212 and the first connecting wall 213. That is, the grooves 2161 do not extend to ends of the first lateral walls 212 that are connected to the first connecting wall 213. In this embodiment, the first connecting wall 213 defines a front of the first housing body 21. The first connecting wall 213 cooperates with the first lateral walls 212 to form a U shape, to define a first containing space 214, and to define a first opening 215.

In this embodiment, the first housing body 21 further includes a first male-and-female engaging structure 210 formed on the bottom wall 211 adjacent to a rear edge of the bottom wall 211, and a pair of engaging blocks 217 disposed resiliently and respectively on outer faces of the first lateral walls 212, as best shown in FIG. 3 (only one is shown due to the viewing angle). The first male-and-female engaging structure 210 is defined by a plurality of spaced apart groove sections 2101 extending horizontally. Preferably, the first male-and-female engaging structure 210 further includes a plurality of protruding portions 2102, each of which is disposed on a top face of the bottom wall 211, has a vertical cross-section in a form of an inverted L-shape, and cooperates with the top face of the bottom wall 211 to define one of the groove sections 2101. Preferably, each of the first lateral walls 212 is formed with a U-shaped through slot 218 disposed adjacent to the first connecting wall 213 that configures a portion of the first lateral wall 212 as a resilient arm 219 on which a corresponding one of the engaging blocks 217 is disposed.

Figure 4:
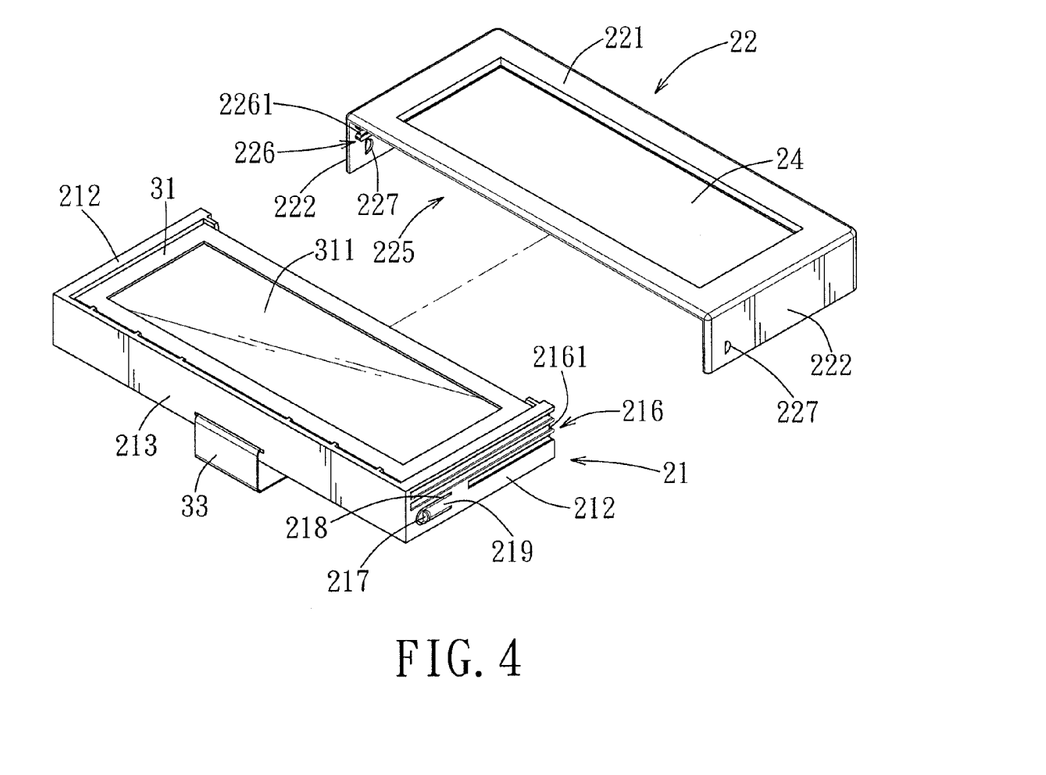
FIG. 4 is a perspective view for illustrating coupling of a first housing body of the preferred embodiment to a second housing body thereof.
Figure 5:
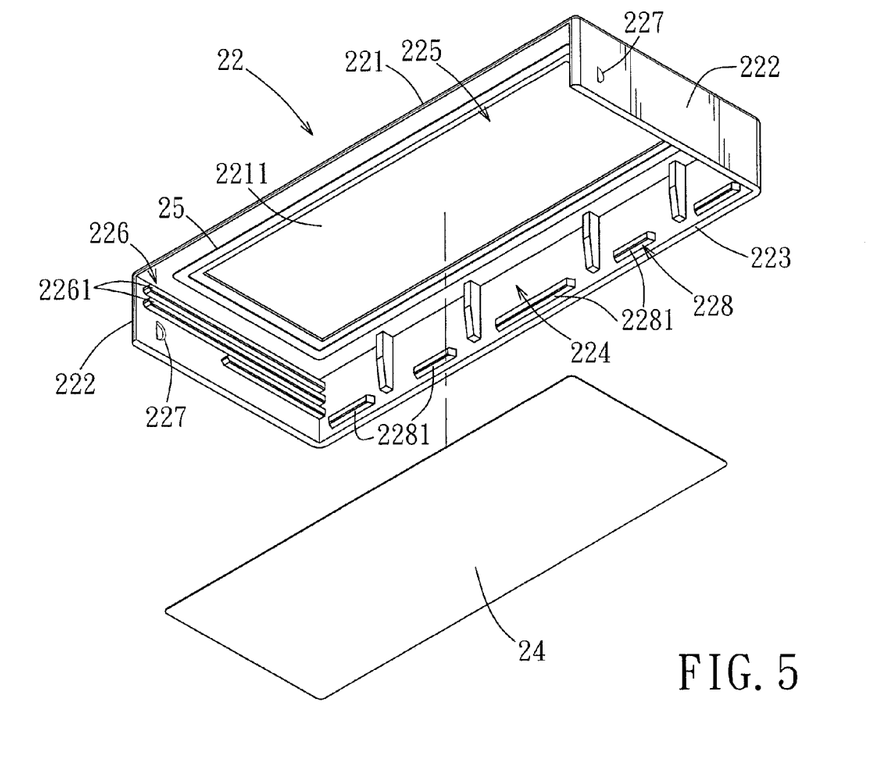
FIG. 5 is an exploded perspective view of the second housing body and a transparent protective cover of the preferred embodiment.

Referring to FIGS. 2 to 5 and FIG. 7, the second housing body 22 includes a top wall 221 having a window region 229, a pair of second lateral walls 222 spaced apart from each other and extending downward from left and right edges of the top wall 221, and a second connecting wall 223 extending downward from a rear edge of the top wall 221 and interconnecting the second lateral walls 222. Each of the second lateral walls 222 of the second housing body 22 has a horizontally extending second rail-and-groove engaging structure 226 formed thereon, as best shown in FIGS. 3 to 5 (only one is shown due to the viewing angle). In this embodiment, each of the second lateral walls 222 has an inner face formed with the second rail-and-groove engaging structure 226, and each of the second rail-and-groove engaging structures 226 is defined by a plurality of horizontally extending protruding rails 2261 vertically spaced apart from each other. In this embodiment, the second connecting wall 223 cooperates with the second lateral walls 222 to form a U-shape, to define a second containing space 224 (see FIG. 5), and to define a second opening 225.

In this embodiment, the second housing body 22 further includes a second male-and-female engaging structure 228 formed on a front face of the second connecting wall 223 adjacent to a bottom edge of the second connecting wall 223, and a pair of engaging holes 227 disposed respectively in the second lateral walls 222. In addition, the top wall 221 of the second housing body 22 is formed with a window opening 2211. The second male-and-female engaging structure 228 preferably includes a plurality of rib sections 2281 extending horizontally. Each of the engaging holes 227 preferably extends through an end of a corresponding one of the second lateral walls 222 distal from a junction of the second lateral wall 222 and the second connecting wall 223.

In this embodiment, the anti-static housing 2 further comprises an adhesive layer 25 (see FIG. 5) made of anti-static adhesive and disposed on a bottom surface of the top wall 221 of the second housing body 22 and around the window opening 2211, and a transparent protective cover 24 adhered to the bottom surface of the top wall 221 of the second housing body 22 via the adhesive layer 25, the transparent protective cover 24 having a portion that is exposed through the window opening 2211 and that cooperates with the window opening 2211 to define the window region 229.

In this embodiment, the anti-static dielectric layers 23 are anti-static paints applied to one of an outer face of each of the first lateral walls 212 and an inner face of each of the second lateral walls 222, and each of the anti-static dielectric layers 23 covers one of an area of the first rail-and-groove engaging structure 216 and the second rail-and-groove engaging structure 226.

Referring to FIG. 3, the displaying module 3 includes a display body 31 having a displaying screen 311, and connection wiring 33 coupled to the display body 31.

Figure 6:
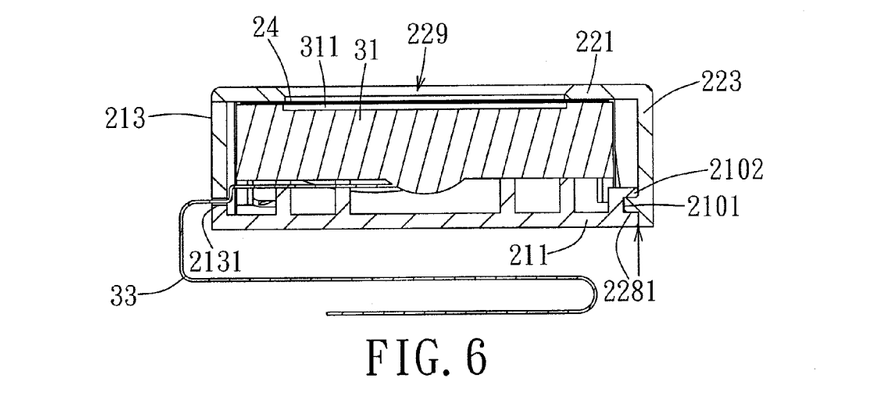
FIG. 6 is a sectional view of the preferred embodiment cut from the front to the rear.
Figure 8:
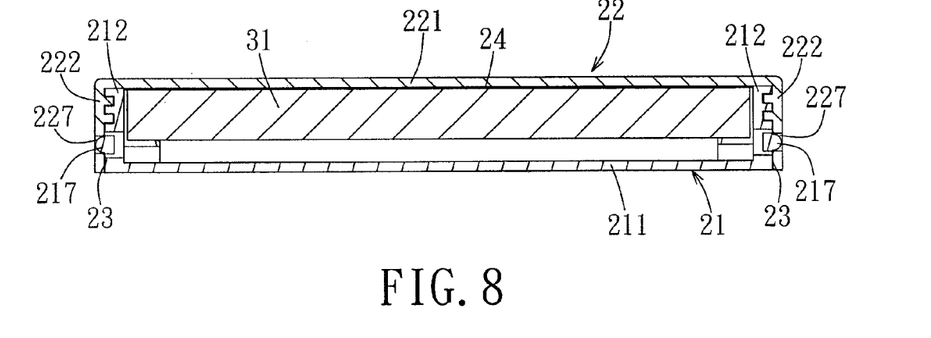
FIG. 8 is a sectional view of the preferred embodiment cut from the left side to the right side at another position.

Referring to FIGS. 3 to 4 and FIGS. 6 to 8, to demonstrate the display device assembly 200, the displaying module body 31 is disposed in the first containing space 214 of the first housing body 21 such that the displaying screen 311 thereof faces upward, and the connection wiring 33 is extended through a slot 2131 formed in the first connecting wall 213 and is for coupling to the telephone. The first and second housing bodies 21,22 are moved relative to each other in horizontal directions, the first opening 215 being moved toward the second opening 225, such that the protruding rails 2261 of the second lateral walls 222 engage the grooves 2161 of the first lateral walls 212, as shown in FIG. 7. The engaging blocks 217 of the first lateral walls 212 then extend into and engage the engaging holes 227 of the second lateral walls 222, as shown in FIG. 8. Lastly, when the engaging blocks 217 engage the engaging holes 227, the rib sections 2281 of the second housing body 22 engage the groove sections 2101 of the first housing body 21, as shown in FIG. 6.

The first housing body 21 is thus coupled to the second housing body 22 such that the first housing body 21 is disposed in the second containing space 224 of the second housing body 22, such that the first lateral walls 212 are disposed on inner sides of the second lateral walls 222, such that the first housing body 21 and the second housing body 22 cooperate to form a box-shaped structure, such that the displaying screen 311 of the displaying module body 31 is visible through the window region 229, and such that the anti-static dielectric layers 23 are disposed between adjacent pairs of the first and second lateral walls 212,222.

To remove the first housing body 21 from the second housing body 22, the engaging blocks 217 of the first lateral walls 212 are pressed so as to disengage the engaging holes 227 of the second lateral walls 222. The first housing body 21 can then be pulled from the second housing body 22.

After assembly of the display device assembly 200, when an electrostatic discharge (ESD) gun is used to discharge an electric charge at seam locations (indicated by the arrows in FIGS. 6 and 7) between the first and second housing bodies 21,22 during ESD testing, passage of static electricity through gaps between the first and second housing bodies 21,22 and into the anti-static housing 2 is impeded by dispositions of the first and second rail-and-groove engaging structures 216,226, and the first and second male-and-female engaging structures 210,228, which impart non-planar surfaces to the first and second housing bodies 21,22 at the seam locations. The displaying module 3 is thus protected from static electricity. In addition, the disposition of the anti-static dielectric layers 23 between the adjacent pairs of the first and second lateral walls 212,222 further impedes passage of static electricity between the adjacent pairs of the first and second lateral walls 212,222. In such a manner, the display device assembly 200 of the present invention has enhanced anti-static characteristics and is thus capable of complying with higher anti-static standards.

It should be noted that the anti-static dielectric layers 23 can be rubber pieces adhered to one of the first rail-and-groove engaging structures 216 on the outer faces of the first lateral walls 212 and the second rail-and-groove engaging structures 226 on the inner faces of the second lateral walls 222. When the first and second housing bodies 21, 22 are coupled to each other, each of the rubber pieces is sandwiched resiliently between a corresponding adjacent pair of the first and second lateral walls 212,222, completely filling the gaps therebetween so as to further enhance the anti-static effect of the dispositions of the first and second rail-and-groove engaging structures 216,226.

Moreover, since the first and second housing bodies 21,22 are engaged through slidingly engaging the first rail-and-groove engaging structures 216 and the second rail-and-groove engaging structures 226, and through engaging the engaging blocks 217 and the engaging holes 227, screw fasteners are not needed to assemble the display device assembly 200. Therefore, a material cost of the screw fasteners and assembly costs associated with fastening operations are eliminated.

Furthermore, the adhesive layer 25, which is disposed on a bottom surface of the top wall 221 and around the window opening 2211 of the second housing body 22, has an anti-static effect that prevents static electricity from entering the anti-static housing 2 between the transparent protective cover 24 and the top wall 221 of the second housing body 22. Therefore, when static electricity is generated on an outer surface of the anti-static housing 2 due to touch of a user or other conditions, the static electricity cannot pass easily into the anti-static housing 2 and adversely affect the displaying module 3.

It is worth mentioning that in this embodiment, since the grooves 2161 of each of the first lateral walls 212 have terminal ends spaced apart from a junction of the first lateral wall 212 and the first connecting wall 213, when the first and second housing bodies 21,22 are coupled together, a gap between an end portion of each of the first lateral walls 212 and an end portion of the adjacent second lateral wall 212 is reduced, thus enhancing the anti-static effect. Moreover, the grooves 2161 of each of the first rail-and-groove engaging structures 216 can be interchanged with the protruding rails 2261 of the second rail-and-groove engaging structures 226. That is, the first rail-and-groove engaging structures 216 can be defined by the protruding rails 2261 and the second rail-and-groove engaging structures 216 can be defined by the grooves 2161. Furthermore, although in this embodiment the first male-and-female engaging structure 210 and the second male-and-female engaging structure 228 are configured as sections, i.e., the groove sections 2101 and the rib sections 2281, respectively, the groove sections 2101 can be replaced with a single elongate groove, and the rib sections 2281 can be replaced with a single elongate rib.

In summary, when the first and second housing bodies 21,22 of the anti-static housing 2 of the present invention are coupled together, the first and second rail-and-groove engaging structures 216,226 and the first and second male-and-female engaging structures 216,226 are disposed such that passage of static electricity through gaps between the first and second housing bodies 21,22 is impeded. Moreover, the anti-static dielectric layers 23 further impede passage of static electricity between adjacent pairs of the first and second lateral walls 212,222. The anti-static housing 2 of the present invention thus has enhanced anti-static characteristics. In addition, use of the first rail-and-groove engaging structure 216 and the second rail-and-groove engaging structure 226 facilitates assembly of the anti-static housing 2 and reduces assembly cost.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An anti-static housing for covering a displaying module, said anti-static housing comprising:
   a first housing body including a bottom wall, a pair of first lateral walls spaced apart from each other and extending upward from said bottom wall, a first connecting wall extending upward from said bottom wall and interconnecting said first lateral walls, and a plurality of first rail-and-groove engaging structures formed on said first lateral walls;

a second housing body including a top wall having a window region, a pair of second lateral walls spaced apart from each other and extending downward from said top wall, and a second connecting wall extending downward from said top wall and interconnecting said second lateral walls, and a plurality of second rail-and-groove engaging structures formed on said second lateral walls; and a plurality of anti-static dielectric layers being disposed on one of said first lateral walls and said second lateral walls of said anti-static housing;

wherein said first and second housing bodies are movable relative to each other in horizontal directions, each of said first lateral walls of said first housing body engages a corresponding one of said second lateral walls of said second housing body by means of engagement of said first rail-and-groove engaging structures of said first lateral walls with corresponding ones of said second rail-and-groove engaging structures of said second lateral walls, and said plurality of anti-static dielectric layers are disposed between adjacent pairs of said first and second lateral walls for impeding passage of static electric charge between said first lateral walls and said second lateral walls when said first housing body and said second housing body are interconnected.

2. The anti-static housing as claimed in claim 1, wherein one of said first rail-and-groove engaging structures and said second rail-and-groove engaging structures is defined by a plurality of horizontally extending protruding rails vertically spaced apart from each other, the other of said first rail-and-groove engaging structures and said second rail-and-groove engaging structures is defined by a plurality of horizontally extending grooves vertically spaced apart from each other, and when said first housing body and said second housing body are coupled to each other, said rails engage said grooves and said first and second housing bodies cooperate to form a box-shaped structure.

3. The anti-static housing as claimed in claim 1, wherein each of said first lateral walls has an outer face formed with said first rail-and-groove engaging structures, said first rail-and-groove engaging structures being defined by a plurality of horizontally extending grooves vertically spaced apart from each other.

4. The anti-static housing as claimed in claim 3, wherein said grooves of each of said first lateral walls have terminal ends spaced apart from a junction of said first lateral wall and said first connecting wall.

5. The anti-static housing as claimed in claim 3, wherein each of said second lateral walls has an inner face formed with said second rail-and-groove engaging structures, said second rail-and-groove engaging structures are defined by a plurality of horizontally extending protruding rails vertically spaced apart from each other, and when said first housing body and said second housing body are coupled to each other, said first lateral walls are disposed on inner sides of said second lateral walls, said rails engage said grooves, and said first and second housing bodies cooperate to form a box-shaped structure.

6. The anti-static housing as claimed in claim 1, wherein said first connecting wall defines a front of said first housing body, said second connecting wall defining a back of said second housing body, said first housing body further including a first male-and-female engaging structure formed on said bottom wall adjacent to a rear edge of said bottom wall, said second housing body further including a second male-and-female engaging structure formed on a front face of said second connecting wall adjacent to a bottom edge of said second connecting wall, said first male-and-female engaging structure engaging said second male-and-female engaging structure when said first housing body and said second housing body are coupled to each other.

7. The anti-static housing as claimed in claim 6, wherein said second male-and-female engaging structure includes a plurality of spaced apart rib sections extending horizontally, and said first male-and-female engaging structure includes a plurality of spaced apart groove sections extending horizontally, said rib sections engaging respectively said groove sections.

8. The anti-static housing as claimed in claim 7, wherein said first male-and-female engaging structure further includes a plurality of protruding portions, each of which is disposed on a top face of said bottom wall, has a vertical cross-section in a form of an inverted L-shape, and cooperates with said top face to define one of said groove sections.

9. The anti-static housing as claimed in claim 7, wherein said top wall of said second housing body is formed with a window opening, said anti-static housing further comprising an adhesive layer made of anti-static adhesive and disposed on a bottom surface of said top wall and around said window opening, and a transparent protective cover adhered to said bottom surface of said top wall of said second housing body via said adhesive layer, said transparent protective cover having a portion that is exposed through said window opening and that cooperates with said window opening to define said window region.

10. The anti-static housing as claimed in claim 1, wherein each of said anti-static dielectric layers covers one of an area of said first rail-and-groove engaging structures and an area of said second rail-and-groove engaging structures.

11. The anti-static housing as claimed in claim 10, wherein said anti-static dielectric layers are anti-static paints applied to one of an outer face of each of said first lateral walls and an inner face of each of said second lateral walls.

12. The anti-static housing as claimed in claim 10, wherein said anti-static dielectric layers are rubber pieces, and when said first housing body and said second housing body are coupled to each other, each of said rubber pieces is sandwiched between a corresponding adjacent pair of said first and second lateral walls.

13. The anti-static housing as claimed in claim 10, wherein said first housing body further includes a pair of engaging blocks disposed resiliently and respectively on outer faces of said first lateral walls, and said second housing body further includes a pair of engaging holes disposed respectively in said second lateral walls, said engaging blocks engaging resiliently and respectively said engaging holes when said first housing body and said second housing body are coupled to each other.

14. The anti-static housing as claimed in claim 13, wherein each of said first lateral walls is formed with a U-shaped through slot that configures a portion of said first lateral wall as a resilient arm on which a corresponding one of said engaging blocks is disposed.

15. The anti-static housing as claimed in claim 14, wherein each of said engaging blocks is disposed adjacent to said first connecting wall.

16. A display device assembly comprising:
a housing covering a displaying module for use as an anti-static housing, said housing including a first housing body, a second housing body, and a plurality of anti-static dielectric layers;
wherein said first housing body includes a bottom wall, a pair of first lateral walls spaced apart from each other and extending upward from said bottom wall, a first connecting wall extending upward from said bottom wall and interconnecting said first lateral walls, and a plurality of first rail-and-groove engaging structures formed on said first lateral walls;

said second housing body includes a top wall having a window region, a pair of second lateral walls spaced apart from each other and extending downward from said top wall, a second connecting wall extending downward from said top wall and interconnecting said second lateral walls, and a plurality of second rail-and-groove engaging structures formed on said second lateral walls; and said anti-static dielectric layers are disposed on one of said first lateral walls and said second lateral walls; and a displaying module having a displaying screen, and being contained in a containing space between said first and second housing bodies;

wherein said first and second housing bodies are movable relative to each other in horizontal directions, each of said first lateral walls of said first housing body engages a corresponding one of said second lateral walls of said second housing body by means of engagement of said first rail-and-groove engaging structures of said first lateral walls with corresponding ones of said second rail-and-groove engaging structures of said second lateral walls, and said plurality of anti-static dielectric layers are disposed between adjacent pairs of said first and second lateral walls for impeding passage of static electric charge between said first lateral walls and said second lateral walls when said first housing body and said second housing body are interconnected.

17. The display device assembly as claimed in claim 16, wherein one of said first rail-and-groove engaging structures and said second rail-and-groove engaging structures is defined by a plurality of horizontally extending protruding rails vertically spaced apart from each other, the other of said first rail-and-groove engaging structures and said second rail-and-groove engaging structures is defined by a plurality of horizontally extending grooves vertically spaced apart from each other, and when said first housing body and said second housing body are coupled to each other, said rails engage said grooves and said first and second housing bodies cooperate to form a box-shaped structure.

18. The display device assembly as claimed in claim 16, wherein each of said first lateral walls has an outer face formed with said first rail-and-groove engaging structures, said first rail-and-groove engaging structures being defined by a plurality of horizontally extending grooves vertically spaced apart from each other.

19. The display device assembly as claimed in claim 18, wherein said grooves of each of said first lateral walls have terminal ends spaced apart from a junction of said first lateral wall and said first connecting wall.

20. The display device assembly as claimed in claim 18, wherein each of said second lateral walls has an inner face formed with said second rail-and-groove engaging structures, said second rail-and-groove engaging structures are defined by a plurality of horizontally extending protruding rails vertically spaced apart from each other, and when said first housing body and said second housing body are coupled to each other, said first lateral walls are disposed on inner sides of said second lateral walls, said rails engage said grooves, and said first and second housing bodies cooperate to form a box-shaped structure.

21. The display device assembly as claimed in claim 16, wherein said first connecting wall defines a front of said first housing body, said second connecting wall defining a back of said second housing body, said first housing body further including a first male-and-female engaging structure formed on said bottom wall adjacent to a rear edge of said bottom wall, said second housing body further including a second male-and-female engaging structure formed on a front face of said second connecting wall adjacent to a bottom edge of said second connecting wall, said first male-and-female engaging structure engaging said second male-and-female engaging structure when said first housing body and said second housing body are coupled to each other.

22. The display device assembly as claimed in claim 21, wherein said second male-and-female engaging structure includes a plurality of spaced apart rib sections extending horizontally, and said first male-and-female engaging structure includes a plurality of spaced apart groove sections extending horizontally, said rib sections engaging respectively said groove sections.

23. The display device assembly as claimed in claim 22, wherein said first male-and-female engaging structure further includes a plurality of protruding portions, each of which is disposed on a top face of said bottom wall, has a vertical cross-section in a form of an inverted L-shape, and cooperates with said top face to define one of said groove sections.

24. The display device assembly as claimed in claim 22, wherein said top wall of said second housing body is formed with a window opening, said anti-static device housing further including an adhesive layer made of anti-static adhesive and disposed on a bottom surface of said top wall and around said window opening, and a transparent protective cover adhered to said bottom surface of said top wall of said second housing body via said adhesive layer, said transparent protective cover having a portion that is exposed through said window opening and that cooperates with said window opening to define said window region.

25. The display device assembly as claimed in claim 16, wherein each of said anti-static dielectric layers covers one of an area of said first rail-and-groove engaging structures and an area of said second rail-and-groove engaging structures.

26. The display device assembly as claimed in claim 25, wherein said anti-static dielectric layers are anti-static paints applied to one of an outer face of each of said first lateral walls and an inner face of each of said second lateral walls.

27. The display device assembly as claimed in claim 25, wherein said anti-static dielectric layers are rubber pieces, and when said first housing body and said second housing body are coupled to each other, each of said rubber pieces is sandwiched between a corresponding adjacent pair of said first and second lateral walls.

28. The display device assembly as claimed in claim 25, wherein said first housing body further includes a pair of engaging blocks disposed resiliently and respectively on outer faces of said first lateral walls, and said second housing body further includes a pair of engaging holes disposed respectively in said second lateral walls, said engaging blocks engaging resiliently and respectively said engaging holes when said first housing body and said second housing body are coupled to each other.

29. The display device assembly as claimed in claim 28, wherein each of said first lateral walls is formed with a U-shaped through slot that configures a portion of said first lateral wall as a resilient arm on which a corresponding one of said engaging blocks is disposed.

30. The display device assembly as claimed in claim 29, wherein each of said engaging blocks is disposed adjacent to said first connecting wall.

* * * * *